H. MUELLER, DEC'D.
O. B. & A. MUELLER, EXECUTORS.
TOOL SHANK.
APPLICATION FILED APR. 29, 1911.
1,034,724.
Patented Aug. 6, 1912.
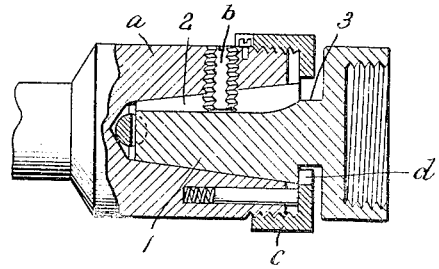
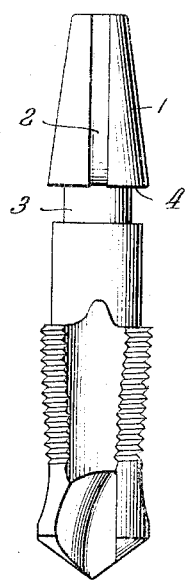
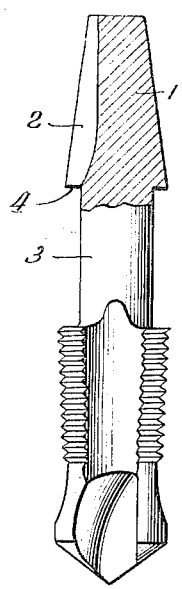
Witnesses
Inventor
Henry Mueller
Ora B. Mueller
Adolph Mueller } Executors.
By Meyers, Cushman & Rea
Attorneys

UNITED STATES PATENT OFFICE.

HENRY MUELLER, DECEASED, LATE OF DECATUR, ILLINOIS, BY ORA B. MUELLER AND ADOLPH MUELLER, EXECUTORS, OF DECATUR, ILLINOIS, ASSIGNORS TO H. MUELLER MANUFACTURING COMPANY, OF DECATUR, ILLINOIS, A CORPORATION OF ILLINOIS.

TOOL-SHANK.

1,034,724.      Specification of Letters Patent.      Patented Aug. 6, 1912.

Application filed April 29, 1911. Serial No. 624,194.

*To all whom it may concern:*

Be it known that HENRY MUELLER, deceased, late a citizen of the United States, and resident of Decatur, county of Macon, and State of Illinois, did during his lifetime invent certain new and useful Improvements in Tool-Shanks, of which the following is a specification.

This invention relates to certain new and useful improvements in tool shanks particularly adapted for use in connection with a tool retaining device of the type illustrated in the co-pending application of Henry Mueller, deceased, and Anton C. Schuermann, filed April 1, 1911, and the object of the invention is to provide a tool-shank with means for preventing relative rotation between the shank and the tool-retaining device or socket-head of the boring-bar with which the tool is associated and also with means for preventing withdrawal of the tool from its socket-head.

In the accompanying drawing, the improved shank is shown in connection with a tool for removing and inserting corporation cocks, and also in connection with a combined drill and tap such as employed in drilling and tapping a main, but it is to be understood that these showings are merely illustrative and are not to be considered as restrictive, the right being reserved to apply the improvements to any type of tool to which it is applicable.

Referring to the drawings, Figure 1 is a longitudinal sectional view of a socket-head having associated therewith, a tool-shank constructed according to this invention, the particular tool shown being of the type employed for removing and inserting corporation cocks. Fig. 2 is an elevation of a combined drill and tap having one form of shank constructed according to this invention. Fig. 3 is a similar view of a slightly modified construction, the shank being shown in section.

Referring to the drawing, the reference numeral 1, designates the shank of the tool, which is preferably made tapering toward its end as shown, to fit in a correspondingly tapered socket formed in a socket-head $a$, as shown in Fig. 1. The said shank is provided throughout its length with a longitudinal groove 2, to receive a projection $b$, carried by the head $a$, said projection serving to prevent relative rotation between the socket-head and tool.

The tool-shank 1, is joined to the tool proper by means of a contracted neck-portion 3, said neck being smaller in diameter than the diameter of the shank 1, at its base or inner end, said inner end of the shank being cut or formed at an angle to the surface of the neck 3, in order to provide an annular shoulder 4, at the base of the shank, which shoulder is intersected by the longitudinal groove 2, as clearly shown in the drawings. The annular wall of the shoulder 4, is straight throughout its width and preferably forms a right-angle with the wall surface of the neck-portion 3 in order to present a flat engaging surface for the retaining lug $c$ carried by the locking collar or ring $d$. The said shoulder 4, may be formed by cutting an annular groove in the shank-portion of the tool as illustrated in Fig. 2, or by making the shank-portion of the tool of sufficiently reduced diameter throughout its length, as illustrated in Fig. 3.

When a tool having my improved construction of shank is inserted in a socket-head, such for instance as illustrated in Fig. 1, the projection $b$, entering the longitudinal groove 2, will prevent the shank from turning in the socket-head, and the annular shoulder 4, constitutes a stop which coöperates with the lug $c$, to prevent withdrawal of the shank from the socket-head, except when the said lug $c$ is brought, through the rotation of the ring or collar $d$, into alinement with the longitudinal groove 2, when the tool may be removed or inserted.

My improved tool shank is simple in construction, cheap to manufacture and is easy to insert into and remove from the socket-head, and may be readily formed on any type of tool.

What I claim is:—

A tool of the character described having an integral shank at one end provided with a longitudinal groove extending throughout the length of the shank, and an annular shoulder at the base of the shank, the wall of said shoulder being flat and arranged at a right angle to the longitudinal axis of the tool, and said groove intersecting said shoulder.

In testimony whereof we have hereunto set our hands in the presence of two subscribing witnesses.

ORA B. MUELLER,
ADOLPH MUELLER,
*Executors of Henry Mueller, deceased.*

Witnesses:
LEONARD F. McKIBBEN,
WILLIAM R. BIDDLE.